United States Patent [19]

Mottet et al.

[11] Patent Number: 4,818,574
[45] Date of Patent: Apr. 4, 1989

[54] PROCESS OF FORMING A REFRACTORY MASS AND MIXTURE OF PARTICLES FOR FORMING SUCH A MASS

[75] Inventors: Léon-Philippe Mottet, Tarcienne; Pierre Robyn, Nivelles; Pierre Laroche, Nalinnes, all of Belgium

[73] Assignee: Glaverbel, Brussels, Belgium

[21] Appl. No.: 49,388

[22] Filed: May 13, 1987

[30] Foreign Application Priority Data

May 16, 1986 [LU] Luxembourg ............................ 86431

[51] Int. Cl.$^4$ ............................................... B05D 1/10
[52] U.S. Cl. ..................................... 427/422; 427/426
[58] Field of Search ......................... 427/422, 423, 426

[56] References Cited

U.S. PATENT DOCUMENTS

| | | | |
|---|---|---|---|
| 4,093,755 | 6/1978 | Dahl | 427/423 |
| 4,230,750 | 10/1980 | Yurasko | 427/423 |
| 4,560,591 | 12/1985 | Plumat et al. | 427/422 |
| 4,696,855 | 9/1987 | Pettit et al. | 427/423 |

FOREIGN PATENT DOCUMENTS 1330894 9/1973 United Kingdom .
2170191 7/1986 United Kingdom .

*Primary Examiner*—Shrive Beck
*Attorney, Agent, or Firm*—Spencer & Frank

[57] ABSTRACT

A process of forming a coherent refractory mass on a surface comprises projecting against that surface, together with oxygen, a mixture of refractory particles and fuel which reacts in an exothermic manner with the projected oxygen to release sufficient heat to melt at least the surfaces of the refractory particles and thus form the refractory mass. The projected mixture contains, as fuel, finely divided particles of at least one element which is oxidizable to form a refractory oxide and it also contains carbonaceous particles which are of such a size or composition that carbon particles become occluded in the formed refractory mass. The mixture may contain, as said fuel, finely divided particles having a mean grain size of less than 50 $\mu$m of silicon, aluminium and/or magnesium. The carbonaceous particles may comprise a carbonaceous core which is covered by a mantle inhibiting oxidation of the core. The mixture may further contain particles comprising a core of at least one element which is oxidizable to form a refractory oxide which is covered by a mantle inhibiting oxidation of the core. Suitable mantle materials include metallic oxides, nitrides and carbides.

17 Claims, No Drawings

PROCESS OF FORMING A REFRACTORY MASS AND MIXTURE OF PARTICLES FOR FORMING SUCH A MASS

BACKGROUND OF THE INVENTION

1. Field of the Invention

This invention relates to a process of forming a coherent refractory mass on a surface by projecting against that surface, together with oxygen, a mixture of refractory particles and fuel which reacts in an exothermic manner with the projected oxygen to release sufficient heat to melt at least the surfaces of the refractory particles and thus form said refractory mass. The invention also relates to a mixture of particles for use in a process of forming a coherent refractory mass on a surface by projecting against that surface the mixture and oxygen, said mixture comprising refractory particles and fuel particles which are capable of reacting in an exothermic manner with oxygen to release sufficient heat to melt at least the surfaces of the refractory particles for forming said refractory mass.

2. Description of the Related Art

If it is desired to form a refractory mass in situ on a surface, there is a choice between two types of known process.

In a first type of process, sometimes referred to as "ceramic welding" and illustrated by British Pat. No. 1 330 894 (Glaverbel) and British Patent Application published under No. GB 2 170 191 A (Glaverbel), a coherent refractory mass is formed on a surface by projecting against the surface a mixture of refractory particles and fuel particles, together with oxygen. The fuel particles used are particles whose composition and granulometry are such that they react exothermically with the oxygen to result in the formation of refractory oxide and release the heat required to melt at least the surfaces of the projected refractory particles. Aluminium and silicon are examples of such fuels. Because silicon behaves like some metals in that it is able to undergo a strongly exothermic oxidation to form a refractory oxide, although we recognise that silicon should properly be considered as a semi-metal, it is convenient to refer to these fuel elements as metallic. In general it is recommended to project the particles in the presence of a high concentration of oxygen, for example using commercial grade oxygen as carrier gas. In this way a coherent refractory mass can be formed which is adherent to the surface against which the particles are projected. Because of the very high temperatures in the ceramic welding flame, the flame tends to be able to cut through any slag which may be present on the surface of a refractory being treated and soften or melt that surface, so that a good joint is made between the surface being treated and the newly formed refractory mass.

Such known ceramic welding processes may be used for the formation of a refractory element, for example a block of special shape, but they are most commonly used for forming coatings or repairs on refractory blocks or walls, and they are particularly useful for repairing or reinforcing existing refractory structures, for example for repairing walls or wall-coatings of glass-melting furnaces, coke ovens or refractory equipment used in the metallurgical industries. It is usual to effect such an operation while the base refractory is hot, and in some cases it is even possible to effect the repair or reinforcement without interrupting normal operation of the equipment.

It is evident that the efficient working of such ceramic welding processes requires rapid and complete release of the heat liberated by the reactions between the fuel particles and the oxygen. In other words, it is desirable that all the fuel particles will have been completely burnt before they reach the surface being sprayed. Also, the high cost of suitable metallic fuel particles will encourage the ceramic welder to obtain the maximum yield, that is to say to work so that the combustion of the fuel is as complete as possible and no residual unburnt fuel is occluded in the refractory mass formed.

The second type of process for forming a refractory mass in situ on a surface is known as flame spraying. Such processes consist in directing a flame over the location where it is desired to form the refractory mass and projecting refractory powder across the flame. The flame is fed by a gaseous or liquid fuel, and sometimes by powdered coke. It is evident that efficient operation of such flame spraying techniques requires the complete combustion of the fuel to create as hot a flame as possible and obtain the maximum yield. In general, the flame temperature which can be obtained in a flame spraying process is not as great as can be achieved in a ceramic welding technique, with the result that the coherence of the refractory mass formed is not so great, and since the joint between the new refractory mass and the surface of the refractory base is formed at a lower temperature, that joint will not be so secure. Such a flame is much less able to penetrate any slag that may be present on a refractory surface being treated than is the flame of a ceramic welding process.

Ceramic welding and flame spraying techniques such as have just been described are useful for facing or repairing walls or coatings constituted by various classical refractory materials, such as basic, silica, silico-aluminous and zirconiferous refractories.

Nowadays, there is an increasing use of refractories of a new type which is characterised by a high content of carbon particles. These carboniferous refractories are usually based on magnesia or alumina, and they may contain from 5% to 30% or even 35% carbon by weight. Such carboniferous refractories are used in industrial electric melting furnaces and also, in steelworks, in convertors and casting ladles. They are chosen for the high resistance to erosion and corrosion by molten metals and slags.

When facing or refacing a refractory structure, it may be desirable to form a refractory coating having a better resistance to erosion and corrosion than the base material. This is especially the case at parts of the refractory structure which are particularly liable to the effects of molten material, such as the pouring spouts of casting ladles. More usually however, and when repairing a refractory structure, it is preferred to form a refractory mass which has the same composition as the base material. This helps to ensure that the new material is compatible with the base material on which it is formed both as regards its chemical composition and its expansion characteristics. If there is chemical or physical incompatibility between the new and old refractory materials, the joint between them tends to be poor, and the repair or facing can flake off. Thus there is a requirement to be able to form coherent, compact (that is, non-porous) refractory masses which have the same or a closely similar composition to that of the carboniferous refractories referred to above and which will adhere well to a surface of a given refractory material.

Given the requirement for forming a carboniferous refractory mass, it would appear necessary that this must be done at a temperature which is not too high, or under conditions which are not, or are only slightly, oxidising. Thus it would seem appropriate to make use of a flame spraying technique as described above, spraying a mixture of coke and refractory particles under conditions such that there is insufficient oxygen for complete combustion of the coke. An alternative method would be to apply a paste of the required composition and fire it en masse.

SUMMARY OF THE INVENTION

Much to our surprise, we have found that it is possible to form carboniferous refractories by using a ceramic welding technique in which refractory and fuel particles are projected under highly oxidising conditions which result in a flame of very high temperature. This is surprising because it would normally be expected that the simultaneous presence in the projected mixture of carbon particles and metallic fuel particles would result in the early oxidation and disappearance of the carbon particles, with a retardation of the oxidation of the fuel particles.

According to the present invention, there is provided a process of forming a coherent refractory mass on a surface by projecting against that surface, together with oxygen, a mixture of refractory particles and fuel which reacts in an exothermic manner with the projected oxygen to release sufficient heat to melt at least the surfaces of the refractory particles and thus form said refractory mass, characterised in that the projected mixture contains, as said fuel, finely divided particles of at least one element which is oxidisable to form a refractory oxide and in that the projected mixture also contains carbonaceous particles which are of such a size or composition that carbon particles become occluded in the formed refractory mass.

The term "carbon particles" as used herein denotes particles which comprise carbon in the elemental state, no matter what its allotropic form. The expression "carbonaceous particles" denotes particles of pure carbon and also particles of carbon mixed or chemically combined with other material in such a way that the particles can decompose to leave a carbon residue.

The efficacy of a process according to the present invention is unexpected because it goes wholly against the prior art. In a process according to the present invention, on the one hand, the fuel particles burn in the presence of the oxygen with the release of sufficient heat to melt at least the surfaces of the refractory particles they are projected with, while on the other hand, the carbonaceous particles traverse the region where the fuel burns without becoming oxidised, or at least, without becoming completely oxidised.

The present invention is particularly advantageous because it permits the formation of refractory masses which are highly resistant to attack by molten metals: it permits the repair or facing of carboniferous refractories with a refractory of the same nature, and the formation of a carboniferous refractory mass onto a body of a refractory which is less resistant to attack by molten metals.

Furthermore, such a process has the advantage of simplicity of operation using apparatus of known type, such as that used in the operation of classical ceramic welding processes as referred to earlier in this specification.

The fuel to be used comprises particles of at least one element which is oxidisable to form a refractory oxide. In this way, the fuel and the refractory particles of the mixture can readily be selected so that the resulting mass of cohered particles and refractory oxide combustion products has any desired refractory composition, for example substantially the same composition as that of a refractory surface against which the mixture is projected. It is preferred that the fuel particles are particles of silicon, aluminium and/or magnesium. Particles of these elements are commercially available, and they may be mixed in desired proportions if required.

As is known per se, the size of the fuel particles has an important effect on the efficacy of a classical ceramic welding process. It is desirable in the classical processes that the fuel particles should be of small size so that they combust rapidly and completely during their trajectory from a lance used for projection to the surface being operated on. This gives a rapid release of heat and results in a flame of very high temperature in order to achieve a satisfactory melting of the refractory particles and thus give a coherent and compact refractory mass. To our surprise, we have found that a similar fuel granulometry is to be recommended in a process according to the present invention. Thus for the best results, the fuel particles should have a mean grain size of less than 50 $\mu$m. In fact, it is desirable for the fuel particles to have a granulometry such that at least 90% by weight of them have a grain size of less than 50 $\mu$m. Particles having a mean grain size in the range 5 $\mu$m to 20 $\mu$m are particularly suitable.

The carbonaceous particles may be formed from a material which is readily available at low cost. Amongst materials which are suitable may be cited coal, coke, lignite, charcoal, graphite, carbon fibres, used furnace electrodes, and organic materials such as sugars and synthetic resins. Particular preference is at present given to the use of particles of a polymeric material in view of the ease of processing them prior to projection in the mixture, and in particular of the ease with which polymeric materials may be formed into particles of a desired granulometry. Carbonaceous particles for use in the invention may also be made by applying a polymeric coating onto refractory particles.

It is possible to rely merely on the size of the carbonaceous particles to prevent their complete combustion during projection so that carbon particles become occluded in the refractory mass formed. An outer skin of the particle may be permitted to burn to leave a carbon core which becomes occluded in the refractory. If this is to be done, it is preferable that said carbonaceous particles have a mean grain size in excess of 0.5 mm.

It is preferable however to rely on the composition of the carbonaceous particles, and advantageously, said carbonaceous particles comprise particles composed of a core of carbonaceous material which is covered with a mantle of a material which inhibits oxidation of such core. This facilitates the formation of a refractory mass with occluded carbon particles. In particular, the adoption of this feature increases control over the amount of carbon which will be so occluded. If the mantle material prevents oxidation of the carbonaceous core, it follows that all the carbon contained in the core will be occluded, with the result that a carboniferous refractory of a given occluded carbon content can be formed reliably from a projected particle mixture of a given composition.

Reference has so far been made to the occlusion of only carbon particles in a refractory mass for the formation of a carboniferous refractory. In current industrial practice there has also arisen the use of carboniferous refractories which contain occluded particles of an element which is oxidisable to form a refractory oxide. Particular examples of such elements are silicon, magnesium, zirconium and aluminium. The purpose of including these elements is to reduce oxygen diffusion through the refractory, and thus to improve the performance of the refractory body. Any oxygen which diffuses into the refractory tends to combine with such elemental particles, and because the result of such combination is a refractory oxide, the structure of the refractory is not significantly weakened by the appearance, for example, of voids. Because silicon behaves like some metals in this respect also, it is convenient to denote refractories in which such particles are occluded by the term "metalliferous".

As with carboniferous refractories, so it is desirable to be able to effect in situ hot repair or reinforcement of metalliferous refractories.

As will have been noted, those metallic elements include elements whose use is particularly recommended in fuel particles for use in a ceramic welding process. Surprisingly, we have found that by taking certain steps, it is possible to use a ceramic welding process to form a carboniferous refractory mass which contains of occluded metallic particles.

Accordingly, certain preferred embodiments of the present invention provide that the projected mixture further contains particles comprising at least one element which is oxidisable to form a refractory oxide which further particles are of such a size or composition that particles of such element become occluded in the formed refractory mass.

The choice of metallic element(s) for incorporation in such further particles will depend on the composition of the refractory matrix in which they are to be occluded, and the properties required of the refractory mass before, during and after any oxidation of such particles. In general, it is preferred that such further particles comprise at least one of silicon, magnesium, zirconium and aluminium.

It is preferred that such further particles comprise particles composed of a core of at least one said element which is oxidisable to form a refractory oxide which core is covered with a mantle of a material which inhibits oxidation of such core. This permits a better control and predictability of the amount of such core element which will become occluded in the formed refractory mass than is possible by simply relying on the size of the further particles.

The mantles covering carbonaceous cores and the mantles covering metallic cores may conveniently be selected from the same classes of materials. It is desirable to choose an inorganic material which is substantially inert with respect to oxygen so as effectively to inhibit oxidation of the core material, and which will not create any defect in the refractory mass formed. This enables the use of particles having carbonaceous or metallic cores whose carbon and, if used metallic, content is in exact correspondence with the quantity of carbon or metallic particles to be occluded in the refractory, and it avoids any necessity of using materials whose reactions may be uncertain or difficult to control quantitatively during projection. Preferably therefore, the material of a said mantle comprises one or more metallic oxides, nitrides or carbides, and advantageously, the said mantles comprise one or more oxides, nitrides or carbides of magnesium, aluminium, silicon, titanium, zirconium or chromium. Such compounds can be deposited rather easily on solid particles, and they have a refractory character which is compatible with the refractory mass which will be formed by the process. The mantle may be formed as a continuous coating which wholly encloses the core in the manner of an eggshell, or it may, especially when the core is porous, be absorbed or adsorbed as a superficial coating on the core. In either case, the mantle protects the core, whether of carbonaceous or metallic material, against oxidation.

In some preferred embodiments of the invention, the said metallic oxide, nitride or carbide is deposited under vacuum. This can be done by evaporation of the metallic material followed by combination of the latter with oxygen, nitrogen or carbon to form the corresponding oxide, nitride or carbide.

In other preferred embodiments of the invention, the said metallic oxide, nitride or carbide is deposited by placing particles of the core material in contact with a reactive liquid and subsequently heating them. In this way, the cores to be protected can easily be mixed with one or more reagents, for example one or more organometallic compounds, which is or are liquid or in solution, and then exposed to sufficient heating to drive off any solvent present and pyrolyse the reagent(s) to form the mantles. Such a process may advantageously be used to deposit one or more oxides or carbonaceous particles by heating to a temperature of around 500° C.

In yet other preferred embodiments of the invention for the formation of metalliferous refractories, the said core particles of at least one element which is oxidisable to form a refractory oxide are superficially oxidised to form an oxide mantle by exposing them to heat and oxygen in a fluidised bed. This is a particularly convenient way of protecting such particle cores against oxidation during projection.

Preferably, the said core particles are maintained in movement during the deposition of the said metallic oxide, nitride or carbide. This allows the uniform treatment of a large number of particle cores at the same time. The particle cores can be stirred mechanically while they are being coated under vacuum or while they are in contact with a reactive liquid. Alternatively, the particle cores can be treated with a gaseous reagent in a fluidised bed technique.

Contrary to what might be supposed, the effectiveness of the process of the present invention does not depend on working in an environment which has a rather low oxygen content. It is possible, and it is indeed recommended to project the mixture of particles in conditions which are favourable for complete exothermic oxidation of the fuel particles, and it is accordingly preferred that oxygen constitutes at least 60% by volume of the gas which is projected against said surface.

A mixture of particles for use in a process according to the invention as above described itself has certain advantages, and this invention also provides a mixture of particles for use in a process of forming a coherent refractory mass on a surface by projecting against that surface the mixture and oxygen, said mixture comprising refractory particles and fuel particles which are capable of reacting in an exothermic manner with oxygen to release sufficient heat to melt at least the surfaces of the refractory particles for forming said refractory mass, characterised in that the mixture contains, as said fuel, finely divided particles having a mean grain size of less than 50 μm of at least one element which is oxidisable to form a refractory oxide, and in that the mixture also contains carbonaceous particles which are of such a size or composition that, when the mixture is projected against a said surface in the presence of oxygen, under conditions which lead to substantially complete oxidation of said fuel particles and the formation of a said coherent refractory mass, the said carbonaceous particles will not become completely oxidised whereby carbon particles become occluded in the formed refractory mass.

Such a mixture of particles permits the formation of carboniferous refractory masses having a high resistance to corrosion and erosion by molten metals and which are capable of conserving such high resistance for a sufficient working life. By the use of such a mixture, for example in a ceramic welding process, compact refractory masses can easily be formed which can adhere well to a variety of refractory surfaces. Because the mixture comprises fuel particles whose means grain size is less than 50 μm (and which preferably have a maximum size not exceeding 50 μm), a complete reaction of the fuel particles is promoted. Such particles react rapidly with oxygen, rapidly releasing the heat necessary to form a compact refractory mass on the surface onto which the mixture is projected. Such a mixture can be obtained without difficulty by mixing together particles which are available commercially, or which may be made specially, but from primary materials which are readily available.

The refractory particles of the mixture may be of any desired composition. By way of example, they may be particles of one or more of sillimanite, mullite, zircon, silica, zirconia and alumina. The mixture can thereby be adapted for forming a carboniferous refractory mass having a composition which corresponds with one of a large number of common refractory formulations. It is particularly preferred that said refractory particles are at least mainly particles of magnesium oxide, so as to allow the formation of basic refractory masses which are compatible with most of the refractory equipment which is used in contact with molten metals.

The starting carbonaceous materials do not need to be pure carbon but may, as indicated earlier, contain carbon mixed or chemically bound with other elements. Coal, graphite, lignite, coke, charcoal, carbon fibres, electrode residues from electrical furnaces, etc, synthetic resins, organic materials such as sugars, etc can thus be chosen. Particular preference is at present given to the use of particles of a polymeric material in view of the ease of processing them prior to projection in the mixture, and in particular of the ease with which polymeric materials may be formed into particles of a desired granulometry. Also, as has been mentioned, carbonaceous particles for use in the invention may be made by applying a polymeric coating onto refractory particles.

In accordance with some preferred embodiments of the mixture according to the invention, the said carbonaceous particles have a mean grain size in excess of 0.5 mm. Such particles are readily produced from ground and screened carbonaceous materials. Particles which have a mean diameter of more than 0.5 mm do not require special treatment to be made relatively or completely unreactive towards oxygen. On the contrary, it is possible to allow these particles to oxidise superficially while retaining or forming a core of carbon which remains in a refractory mass formed by projection of the said mixture in oxygen. To produce a carboniferous refractory mass containing carbon particles of a given mean diameter, it is recommended to choose a starting mixture comprising carbonaceous particles whose mean diameter is at least twice that given diameter.

It is however preferred that said carbonaceous particles comprise particles composed of a core of carbonaceous material which is covered with a mantle of a material which, when the mixture is projected against a said surface in the presence of oxygen and under conditions which lead to substantially complete oxidation of said fuel particles and the formation of a said coherent refractory mass, inhibits oxidation of such core. Particles of this kind can be kept, stored and handled in an atmosphere containing oxygen without any special precautions. This also greatly facilitates prediction of the grain sizes of the carbon particles which will be occluded in the carboniferous refractory mass formed by projecting the mixture under said conditions, and thus facilitates the reliable formation of a refractory mass of a desired composition from a mixture of predetermined proportions of its various ingredients.

In some preferred embodiments of the mixture of the invention, the mixture further contains particles comprising at least one element which is oxidisable to form a refractory oxide which further particles are of such a size or composition that, when the mixture is projected against a said surface in the presence of oxygen and under conditions which lead to substantially complete oxidation of said fuel particles and the formation of a said coherent refractory mass, such further particles will not become completely oxidised, whereby particles of such elements(s) become occluded in the formed refractory mass.

Occluded material of this kind endows the refractory masses formed from the mixture with enhanced corrosion resistance. Mixtures of this kind can also be produced without any difficulty. Mixtures of this kind can be formed by using commercially available metal powders.

Preferably, at least one of silicon, magnesium, zirconium and aluminium is or are present in such further particles.

Advantageously, such further particles comprise a core of at least one said element which is oxidisable to form a refractory oxide which is covered with a mantle of a material which, under said conditions, inhibits oxidation of such core.

Preferably, the material of a said mantle comprises one or more metallic oxides, nitrides or carbides, and advantageously, the said mantles comprise one or more oxides, nitrides or carbides of magnesium, aluminium, silicon, titanium, zirconium or chromium. Such compounds deposit onto the particle cores without difficulty, without unduly increasing their cost. They may form a layer surrounding the core and thus form a shell or, alternatively, they may impregnate the surface layers of the core if the later is porous. A deposit of this kind can be formed on the cores by, for example, vacuum evaporation of the metal followed by its combination with oxygen, nitrogen or carbon or by the deposition of an organometallic precursor which is converted into oxide at a moderate temperature. Particles of this kind are subjected to a special preparation before being integrated into the mixture, but the time or the costs required for this preparation are largely compensated by the safety of use of the latter, and the predictability of the results when the mixture is used in a ceramic welding process.

In order to protect the particle cores against oxidation with a satisfactory degree of safety, the material of said mantles preferably represents from 0.02% to 2% by weight of the particles comprising mantles. Such a quantity of mantle material permits the formation of quite complete layers around these particles.

In order to make it possible to form refractory masses with a composition similar to commercially available carboniferous refractories which are optionally also metalliferous, it is preferred that the carbonaceous particles, and the said further particles, if any, are present in a total amount of from 2 to 50% by weight of the mixture. Preferably, the quantity of carbonaceous particles is between 5 and 50% and the quantity of the said further particles (if any) is between 2 and 10%. The presence of such quantities in the mixture ensures the formation, by means of projection in the presence of oxygen, of refractory masses which contain sufficient carbon and, where applicable, sufficient metallic occlusions to impart to the masses a high resistance to corrosion and to erosion by molten materials at elevated temperature.

Both for economic and technical reasons the mixture preferably contains said fuel particles in a proportion of 5 to 30% by weight. Such a quantity of the type of fuel in view is sufficient to cause at least superficial melting of the refractory particles which accompany it when the mixture is projected in the presence of oxygen.

It is possible to choose various different materials as fuel, provided that they oxidise rapidly with a large heat release and result in the formation of a refractory oxide. Particles of silicon, of aluminium and/or of magnesium form refractory oxides, and this contributes to the formation of compact, high grade masses which contain no inclusions that are incompatible with good heat resistance.

The present invention also relates to a refractory mass containing dispersed carbon particles and formed by a process such as described above, as well as a refractory mass containing dispersed carbon particles formed by projecting, in the presence of oxygen, a mixture such as described earlier.

DESCRIPTION OF THE PREFERRED EMBODIMENTS

The present invention will now be illustrated in more detail with the aid of the examples which follow.

EXAMPLE 1

A refractory mass is deposited onto a converter wall consisting of magnesia-carbon bricks having the following composition: MgO 90%, C 10%. A mixture of refractory particles, of fuel particles which are exothermically oxidisable to form refractory oxide and of carbonaceous particles which are less liable to complete oxidation is projected onto these bricks. The wall is at a temperature of 900° C. The mixture is projected at a rate of 500 kg/hour in a gas stream containing 70% by volume of oxygen. The mixture has the following composition:
MgO: 82% by weight
Si: 4%
Al: 4%
C: 10%

The silicon particles have a mean grain size of 10 μm and a specific surface of 5,000 cm2/g. The aluminium particles have a mean grain size of 10 μm and a specific surface of 8,000 cm2/g. The carbon particles are particles produced by milling coke and their mean grain size is 1.25 mm. When this mixture is projected onto the hot wall, the silicon and aluminium particles burn, releasing enough heat to cause the magnesia particles to melt, at least superficially. These particles of MgO have a mean grain size of 1 mm. During the projection, the coke particles combine superficially with oxygen, allowing to remain unoxidised carbon cores with a mean grain size of 200 μm which are occluded in the mass deposited on the treated surface. The refractory mass formed contains approximately 3% carbon. It adheres perfectly to the wall, even if there is a covering of slag on the wall prior to the projection, and its composition and its compactness are such that it withstands erosion and corrosion when contact with molten steel.

Similar results were also obtained by replacing the coke particles with carbon particles produced by milling electrode residues.

EXAMPLE 2

The process described in Example 1 was repeated but with the addition into the projected mixture of further particles of silicon intended to remain in elemental form in order to produce a metalliferous refractory mass. These particles have a mean grain size of 35 μm. The reactivity of these particles towards oxygen is reduced by oxidising their surface before they are used in the mixture. A shell of oxide is produced around the particles by treating them in a bed fluidised with hot oxygen. The projection of this mixture onto the wall consisting of magnesia-carbon bricks forms a compact mass therein, which is particularly resistant to corrosion in contact with the hot atmosphere of the converter, molten steel and its slags.

In a variant embodiment, the further particles of silicon which are intended to remain in the mass formed are not given mantles to protect them against oxidation but instead, they have a minimum diameter of 100 μm. The use of a mixture containing such further particles gives results which are similar to those indicated above.

EXAMPLE 3

A particle mixture consisting of MgO refractory, silicon and aluminium fuel, and carbon consisting of a carbon core onto which a layer of aluminium oxide has been deposited are projected onto a wall consisting of refractory of the magnesia-carbon type, at a temperature of 900° C. The projection rate is 100 kg/hour in a gas stream containing 70% of oxygen (by volume). The mixture has the following composition:
MgO: 75% by weight
Si: 4%
Al: 4%
C: 17%

The silicon and aluminium particles have a mean grain size and a specific surface which are similar to those mentioned in Example 1. The carbon particles have a mean grain size of 1mm and the aluminium oxide is present in a proportion of 1% based on the weight of carbon. The oxide deposit is formed on the carbon particles by depositing aluminium onto the particles under vacuum and then oxidising the metallic layer. The projection of this mixture onto the hot refractory wall gives rise to a compact mass which adheres well and contains more than 10% carbon.

By way of an alternative embodiment, the process described above was carried out by replacing the aluminium oxide-coated carbon particles with carbon particles onto which a layer of titanium oxide was deposited. A layer of titanium oxide is deposited onto the particles by mixing the latter with a liquid organic orthotitanate and then decomposing the titanate at a temperature of the order of 500° C. This produces a result which is wholly similar to that described above.

EXAMPLE 4

A refractory mass is deposited onto a wall at a temperature of 900° C. The wall consists of carboniferous refractory. Its composition is as follows: $Al_2O_3$ 85%, C 15%. A mixture of refractory particles, of fuel particles and of particles of a carbon compound is projected onto the surface of this wall at a rate of 200 kg/hour, in a carrier gas containing 70% of oxygen (by volume). The characteristics of the mixture are as follows:

$Al_2O_3$: 70% by weight
Si: 20%
C: 10%

The refractory particles have a grain size of between 300 μm and 1 mm and the silicon fuel particles have characteristics which are similar to those described in Example 1. The particles of carbon compound have a mean grain size of less than 50 μm and consist of ground polyacrylo-nitrile. During projection, these paticles carbonise and the resultant carbon is occluded in the refractory mass which adheres to the hot wall. Well compacted refractory masses which resist erosion by contact with liquid metals and their slags are produced in this manner.

In variants, the polyacrylonitrile powder was replaced with sucrose powder, phenolic resin, epoxy resin and polyallyl chloride and similar results were obtained. In some cases it may be favourable to retard the carbonisation of these materials by covering the particles with a self-extinguishable polymer coating.

What is claimed is:

1. A process of forming a coherent refractory mass on a surface by ceramic welding comprising:
   projecting against that surface, together with oxygen, a mixture of refractory particles and fuel which reacts in an exothermic manner with the projected oxygen to release sufficient heat to melt at least the surfaces of the refractory particles and thus form said refractory mass, characterised in that said fuel consists essentially of finely divided particles of at least one element which is oxidisable to form a refractory oxide and in that the projected mixture also contains carbonaceous particles which are of such a size or composition that carbon particles become occluded in the formed refractory mass.

2. A process according to claim 1, wherein said carbonaceous particles comprise particles of a polymeric material.

3. A process according to claim 1, wherein said carbonaceous particles have a mean grain size in excess of 0.5 mm.

4. A process according to claim 1, wherein no gaseous or liquid fuel is included in either the projected mixture or the oxygen.

5. A process according to claim 7, wherein the projected mixture further contains particles comprising at least one element which is oxidisable to form a refractory oxide which further particles are of such a size or composition that particles of such element become occluded in the formed refractory mass.

6. A process according to claim 5, wherein such further particles comprise at least one of silicon, magnesium, zirconium and aluminium.

7. A process according to claim 1, wherein said coherent refractory mass is substantially non-porous.

8. A process according to claim 1, wherein said fuel consists exclusively of said finely divided particles.

9. A process according to claim 1, wherein oxygen constitutes at least 60% by volume of the gas which is projected against said surface.

10. A process of forming a coherent refractory mass on a surface, comprising:
    projecting against that surface, together with oxygen, a mixture of refractory particles and fuel which reacts in an exothermic manner with the projected oxygen to release sufficient heat to melt at least the surfaces of the refractory particles and thus form said refractory mass, characterised in that the projected mixture contains, as said fuel, finely divided particles of at least one element which is oxidisable to form a refractory oxide and in that the projected mixture also contains carbonaceous particles which are of such a size or composition that carbon particles become occluded in the formed refractory mass and which comprise particles composed of a core of carbonaceous material which is covered with a mantle of a material which inhibits oxidation of such core.

11. A process according to claim 10, wherein the material of a said mantle comprises one or more metallic oxides, nitrides or carbides.

12. A process according to claim 11, wherein the said metallic oxide, nitride or carbide is deposited under vacuum.

13. A process according to claim 12, wherein the said core particles are maintained in movement during the deposition of the said metallic oxide, nitride or carbide.

14. A process according to claim 11, wherein the said metallic oxide, nitride or carbide is deposited by placing particles of the core material in contact with a reactive liquid and subsequently heating them.

15. A process according to claim 11, wherein the said mantles comprise one or more oxides, nitrides or carbides of magnesium, aluminium, silicon, titanium, zirconium or chromium.

16. A process of forming a coherent refractory mass on a surface comprising:
    projecting against that surface, together with oxygen, a mixture of refractory particles and fuel which reacts in an exothermic manner with the projected oxygen to release sufficient heat to melt at least the surfaces of the refractory particles and thus form said refractory mass, characterised in that the projected mixture contains, as said fuel, finely divided particles of at least one element which is oxidisable to form a refractory oxide, and in that the projected mixture also contains carbonaceous particles which are of such a size or composition that carbon particles become occluded in the formed refractory mass, and in that the projected mixture further contains particles comprising at least one element which is oxidisable to form a refractory oxide, which further particles are of such a size or composition that particles of such element become occluded in the formed refractory mass and are composed of a core of at least one said element which is oxidisable to form a refractory oxide, which core is covered with a mantle of a material which inhibits oxidation of such core.

17. A process according to claim 16, wherein said core particles of at least one element which is oxidisable to form a refractory oxide are superficially oxidised to form an oxide mantle by exposing them to heat and oxygen in a fluidised bed.

* * * * *